United States Patent
Liu et al.

(10) Patent No.: US 9,472,995 B2
(45) Date of Patent: Oct. 18, 2016

(54) WATER-COOLED ELECTRICAL MOTOR

(71) Applicant: Shanghai Yili Electric Co., Ltd., Shanghai (CN)

(72) Inventors: Weicai Liu, Shanghai (CN); Jianping Huang, Shanghai (CN)

(73) Assignee: SHANGHAI YILI ELECTRIC CO., LTD., Shanghai (CN)

(*) Notice: Subject to any disclaimer, the term of this patent is extended or adjusted under 35 U.S.C. 154(b) by 268 days.

(21) Appl. No.: 14/385,899

(22) PCT Filed: Aug. 7, 2013

(86) PCT No.: PCT/CN2013/080940
§ 371 (c)(1),
(2) Date: Sep. 17, 2014

(87) PCT Pub. No.: WO2014/089978
PCT Pub. Date: Jun. 19, 2014

(65) Prior Publication Data
US 2015/0048700 A1  Feb. 19, 2015

(30) Foreign Application Priority Data
Dec. 14, 2012  (CN) .......................... 2012 1 0545703

(51) Int. Cl.
*H02K 5/20* (2006.01)
*H02K 9/19* (2006.01)

(52) U.S. Cl.
CPC . *H02K 5/20* (2013.01); *H02K 9/19* (2013.01)

(58) Field of Classification Search
CPC .................................. H02K 5/20; H02K 9/19
USPC .......................................................... 310/54
See application file for complete search history.

(56) References Cited

U.S. PATENT DOCUMENTS

2005/0253465 A1* 11/2005 Takenaka ................. H02K 5/20
310/52
2006/0181163 A1* 8/2006 Lee ....................... F04D 29/329
310/62

(Continued)

FOREIGN PATENT DOCUMENTS

CN  2822010 Y  9/2006
CN  201075806 Y  6/2008

(Continued)

*Primary Examiner* — Alex W Mok
(74) *Attorney, Agent, or Firm* — Muncy, Geissler, Olds & Lowe, P.C.

(57) ABSTRACT

A water-cooled motor includes a housing (10) for accommodating at least a stator (30) and a rotor (40), the housing (10) having a flange (64) on a side wall thereof; an outer casing (60) disposed around the side wall of the housing, the outer casing (60) having a two-start screw thread (63) formed on an internal surface thereof to provide a water inlet channel (81) and a water outlet channel (82) between the housing (10) and the outer casing (60); a water inlet port (61) and a water outlet port (62), both provided on the outer casing (60) and connected to one end of the water inlet channel (81) and one end of the water outlet channel (82), respectively, wherein the other end of the water inlet channel (81) and the other end of the water outlet channel (82) are interconnected at the flange (64).

9 Claims, 7 Drawing Sheets

(56) References Cited

U.S. PATENT DOCUMENTS

| | | | | |
|---|---|---|---|---|
| 2007/0210655 | A1* | 9/2007 | Bahr | H02K 5/20 310/54 |
| 2008/0169088 | A1* | 7/2008 | Aoki | H01L 23/473 165/104.19 |
| 2008/0179972 | A1* | 7/2008 | Aoki | H01L 21/4878 310/52 |
| 2010/0001597 | A1 | 1/2010 | Noll | |
| 2012/0248908 | A1* | 10/2012 | Zahora | F04D 25/082 310/62 |
| 2013/0169077 | A1* | 7/2013 | Takei | H02K 5/20 310/54 |

FOREIGN PATENT DOCUMENTS

| | | |
|---|---|---|
| CN | 101562366 A | 10/2009 |
| CN | 201450385 U | 5/2010 |
| CN | 103023219 A | 4/2013 |
| CN | 203071738 U | 7/2013 |
| EP | 1810389 B1 | 12/2010 |

\* cited by examiner

WATER-COOLED ELECTRICAL MOTOR

TECHNICAL FIELD

The present invention relates to a water-cooled motor, and particularly to a water-cooled motor for a motor-pump unit of a high-pressure cleaning appliance.

BACKGROUND

Motors are generally cooled by air, water or other cooling medium. Water cooling can provide a motor with an excellent cooling effect, thus enabling the motor to achieve a higher output power with a given cost or achieve a given output power with less used materials and a lower cost. Compared to air-cooled motors, water-cooled motors typically have less noise. Therefore, water-cooled motors are of relatively high economic and practical value for a variety of industries.

Existing water-cooled motors used in motor-pump units can be categorized into several types in terms of their structure. Motors of one of these types include a hollow helical aluminum tube embedded in the motor housing during the manufacture thereof by die casting. Although such motors can be effectively cooled by circulating water in the hollow helical aluminum tube, they have high structural complexity and manufacturing cost. Chinese Patent Publication Nos. CN201450384 U and CN201937382 U disclose motors of another type which employs a structure of a double-walled aluminum cylinder. In this structure, water-tight ribs are evenly distributed between two cylindrical walls; a cover is provided on each of the two ends of the cylinder; and the cover is engraved with water flow grooves. As this structure is composed of a large number of separable parts, it also suffers from high complexity and high manufacturing cost. In addition, due to a low sealability, the structure is vulnerable to water invasion and thus has a high safety risk. Chinese Patent Publication No. CN101663483A discloses a structure of a further type which provides a plurality of injection-molded ribs on inner surface of a plastic housing to form zigzag water flow paths between the plastic housing and the motor cooling housing. This structure is simple and has a lower cost. However, the mode for forming the plastic housing requires the employment of a complex mold with a number of core-pull features, which leads to a high possibility of manufacturing failure in the injection molding process. Additionally, the zigzag paths cause water flows to experience multiple 180 degrees turns in their advancing direction, which lead to a low water flow rate for a given cross-sectional area.

Chinese Patent Publication No. CN102510158A discloses a water-cooled motor with helical water flow grooves. Referring to FIG. 1, an inner housing 2 of the water-cooled motor has an external circumferential surface on which there are formed a plurality of helical water flow grooves 2.0. A circular water-collecting groove is formed at each end of the housing extending along the external circumferential surface, wherein a first circular water-collecting groove 2.1 is formed at a first end and a second circular water-collecting groove 2.2 is formed at a second end. Each of the helical water flow grooves 2.0 extends several equally spaced turns along an axis of the motor and connects the two water-collecting grooves at its two ends. Each of the two water-collecting grooves is provided with two water-splitting plates 2.3. The two plates 2.3 of the first water-collecting groove 2.1 divide the groove 2.1 into a first water inlet groove 2.11 and a first water outlet groove 2.12. The two plates 2.3 of the second water-collecting groove 2.2 divide the groove 2.2 into a second water inlet groove 2.21 and a second water outlet groove 2.22. The first water inlet groove 2.11 and the second water outlet groove 2.22 are interconnected and are further connected to a first water inlet connector 2.11' and a second water outlet connector 2.22', respectively, both disposed on an outer housing 1 of the motor. The second water inlet groove 2.21 and the first water outlet groove 2.12 are interconnected and are further connected to a second water inlet connector 2.21' and a first water outlet connector 2.12', respectively, both disposed on the outer housing 1. As such, two water inflows and two water outflows can be formed by connecting to an external water supply, thus forming a cooling loop with the water inflows and water outflows in lateral symmetry with respect to the motor axis.

In order to achieve the opposite water flows, two connectors are provided on one side and another two connectors are provided on the opposite side of the outer housing (i.e. four connectors in all), which leads to a high structural complexity, high manufacturing and assembly difficulties of the outer housing, and high risk of motor failure causing water leakage. Further, in order to meet the need of heat transfer, the motor housings are formed by metallic materials, and as the thread grooves are formed in the inner housing and the inner housing is integrally formed with the water-splitting plates, the housings can only be manufactured by pressure casting which is a process prone to produce motor housings with gas pores therein, namely the cast structures are not dense. These gas pores may direct water, during the use of the motor, from the grooves into the middle of the motor and hence probably cause electric leakage and electric shock accidents.

Therefore, there is an urgent need in this art for a water-cooled motor capable of a uniform cooling effect and high cooling efficiency while having a simple structure, high manufacturability, low cost, high water tightness, high safety and reliability.

SUMMARY OF THE INVENTION

The present invention provides a water-cooled motor in order to address the issues of high structural complexity, low sealability, low safety and high cost of the prior art motors.

In order to address the above-mentioned issues, the present invention provides a water-cooled motor, which includes: a housing for accommodating at least a stator and a rotor, the housing including a bottom, a side wall, and an opening opposite the bottom, the side wall having a flange formed thereon; an outer casing disposed around the side wall of the housing, the outer casing having a two-start screw thread formed on an internal surface thereof to provide a water inlet channel and a water outlet channel between the housing and the outer casing; a water inlet port arranged on the outer casing and being connected to a first end of the water inlet channel; and a water outlet port arranged on the outer casing, the water outlet port being adjacent to the water inlet port and being connected to a second end of the water outlet channel, wherein a second end of the water inlet channel and a first end of the water outlet channel are interconnected at the flange.

In one preferred embodiment, the motor further includes a water blocking ring mounted on the water inlet port and proximate the water outlet port, the water blocking ring being configured to prevent water that has passed through the water inlet port from flowing directly toward the water outlet port.

In one preferred embodiment, the water inlet port is configured to be able to prevent, after the water blocking ring has been mounted thereon, the water blocking ring from rotating relative to the outer casing.

In one preferred embodiment, the water inlet port and the water outlet port are both disposed on a side of the outer casing proximate the opening of the housing.

In one preferred embodiment, the water-cooled motor further includes: a first transition connector for interconnecting the water inlet port to an external water inlet pipe; and a second transition connector for interconnecting the water outlet port to an external water outlet pipe.

In one preferred embodiment, the housing includes an outwardly flaring lip around the opening.

In one preferred embodiment, the water-cooled motor further includes: a first seal ring disposed between the housing and a first end of the outer casing; and a second seal ring disposed between the housing and a second end of the outer casing.

In one preferred embodiment, the housing is made of a metallic material and the outer casing is made of a plastic material.

In one preferred embodiment, the housing is a one-piece structure. The present invention has the following advantages over conventional water-cooled motors: by forming a two-start screw thread on the internal surface of the outer casing, the water-cooled motor of the present invention is able to isolate two water flow channels between the outer casing and the housing; further, by simply arranging a flange on the side wall of the housing, the two water flow channels 81, 82 can be interconnected without adopting any additional connecting means, which allows the construction of a motor with a greatly simplified structure. Additionally, arranging the inlet and outlet ports on the same side of the outer casing makes the inventive motor more structurally compact. Further, the structural features of the inventive motor allow the housing to be manufactured by sheet metal stretch forming processes which produce dense products, thus eliminating the necessity of employing pressure casting techniques which introduce gas pores in the housing products and may hence cause the problem of water permeation into the motor during its use. Furthermore, the structural features of the inventive motor allow the screw thread to be formed on the outer casing and allow the outer casing to be formed by plastic molding processes, which greatly reduces the manufacturing cost for the outer casing.

In addition, by adopting a simple water-blocking ring, the water-cooled motor of the present invention can not only effectively prevent water having passed through the inlet port from flowing toward the outlet port but also simplify needed molds for the outer casing to greatly reduce the manufacturing cost thereof

DETAILED DESCRIPTION OF THE EXEMPLARY EMBODIMENTS

The forgoing objectives, features and advantages of the present invention will become apparent from the following detailed description of illustrative embodiments thereof, which is to be read in connection with the accompanying drawings. Note that the accompanying drawings of the present invention are provided in a very simplified form not necessarily presented to scale, with the only intention of facilitating convenience and clarity in explanation.

Figure 1:
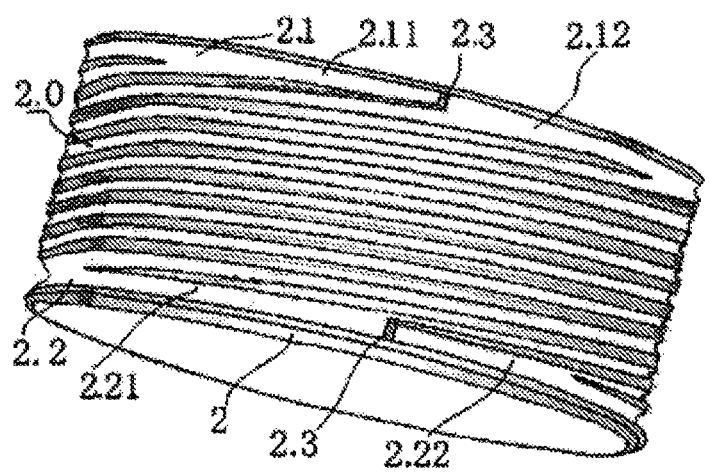
FIG. 1 shows a housing of a prior art water-cooled motor.
Figure 2:
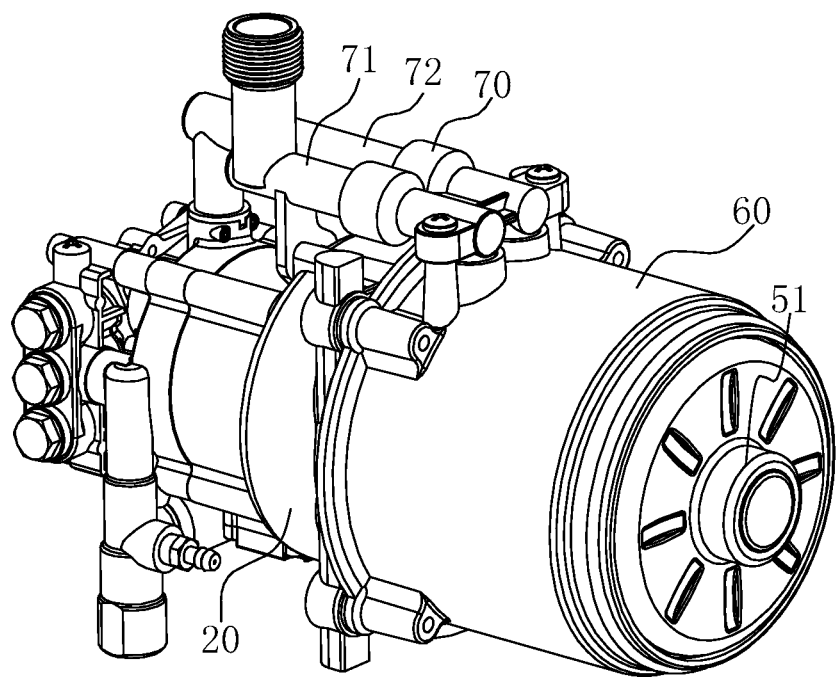
FIG. 2 is a schematic illustration of a motor-pump unit which uses the water-cooled motor of the present invention.
Figure 3:
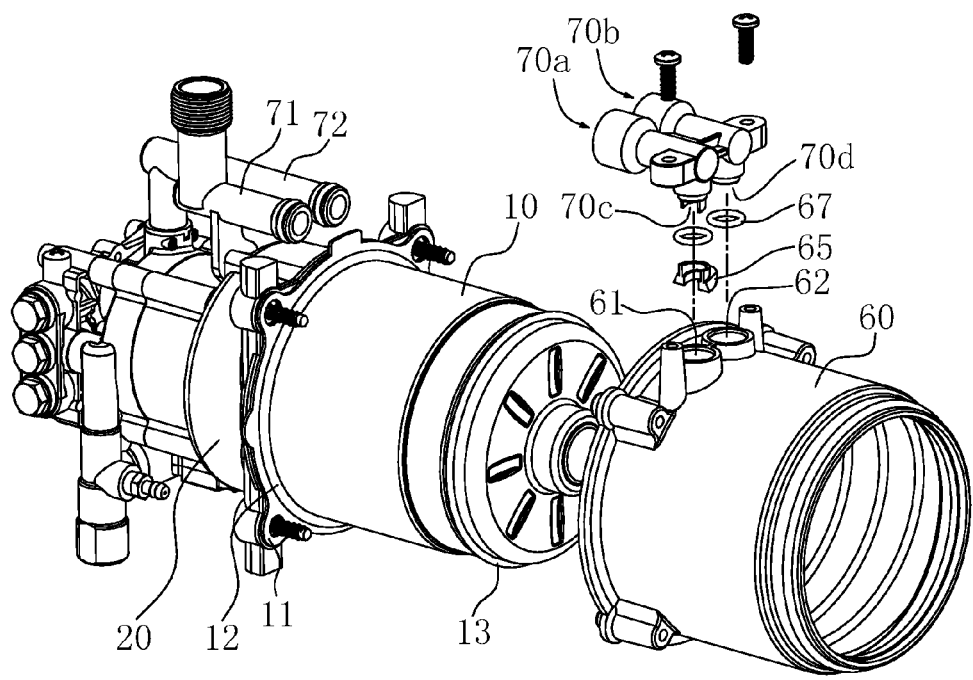
FIG. 3 is an exploded view of FIG. 2.
Figure 4:
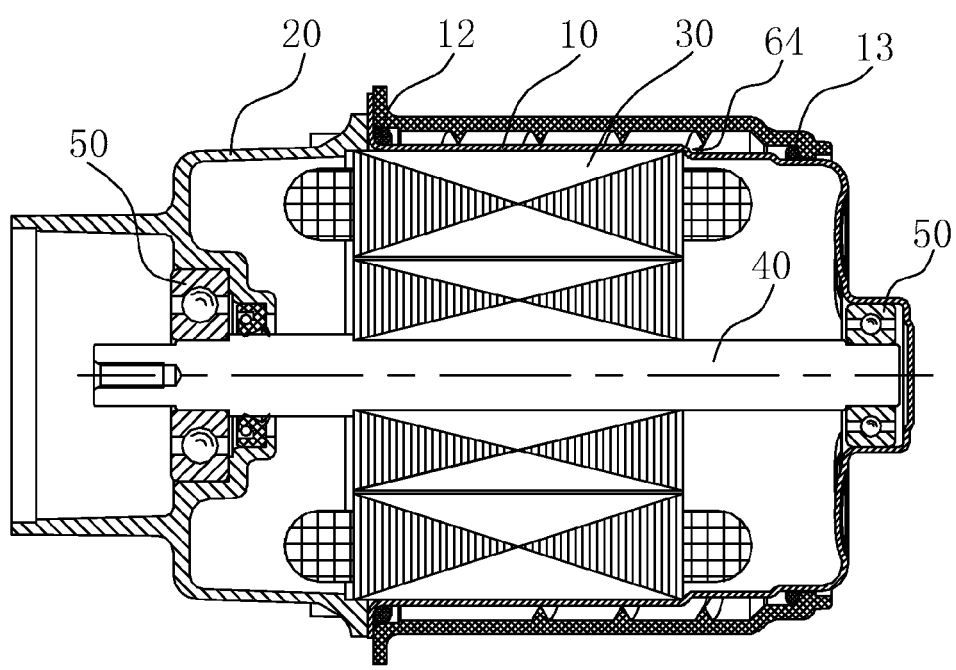
FIG. 4 is a cutaway view of FIG. 2.

The present invention provides a water-cooled motor which is particularly suitable for use in a motor-pump unit. FIGS. 2 to 4 show such a motor-pump unit which uses the water-cooled motor of the present invention. As illustrated, the motor-pump unit includes a housing 10 and an end cover 20 which are positioned opposite to each other. A stator 30, a rotor 40, and two bearings 50 are accommodated within the space between the housing 10 and the end cover 20. The bearings 50 are respectively secured to two ends of the rotor 40, and an outer circumferential surface of the stator 30 is in an interference fit with an internal surface of the housing 10. The housing 10 includes a side wall which defines a flange 64 configured to axially index the stator 30 within the housing 10 and to interconnect a water inlet channel and a water outlet channel, of the water-cooled motor (will be described in detail below).

The housing 10 is surrounded by an outer casing 60. The outer casing 60 may be mounted with a water inlet port 61 and a water outlet port 62 which are adjacent to each other. The outer casing 60 has an internal surface on which there is formed a screw thread 63. The number of turns of the screw thread 63 may be adjustable according to sizes of the housing 10 and the outer casing 60. Each turn of the screw thread 63 may have the same diameter at the bottom. The screw thread 63 divides the space between an outer surface of the housing 10 and an inner surface of the outer casing 60 into water flow channels 80.

Specifically, the outer casing 60 may be formed of a plastic material in order to ensure easy fabrication of the outer casing 60 using forming molds. The housing 10 may be formed using a sheet metal stretch forming process and may have a shape of a cup. The housing 10 has an end defining an opening (corresponding to the opening of the cup) which is fixedly connected to the end cover 20 and an end opposing to the opening (corresponding to the bottom of the cup), defining a bearing chamber 51 for accommodating the bearings 50. The flange 64 divides the side wall of the housing 10 into two sections, wherein a first section proximate the opening has an out diameter greater than an out diameter of a second section proximate the opposing end, and the out diameter of the first section is essentially equal to the bottom diameter of the turns of the screw thread 63, such that a bottom of the screw thread 63 can be in close contact with the side wall of the first section.

Figure 5:
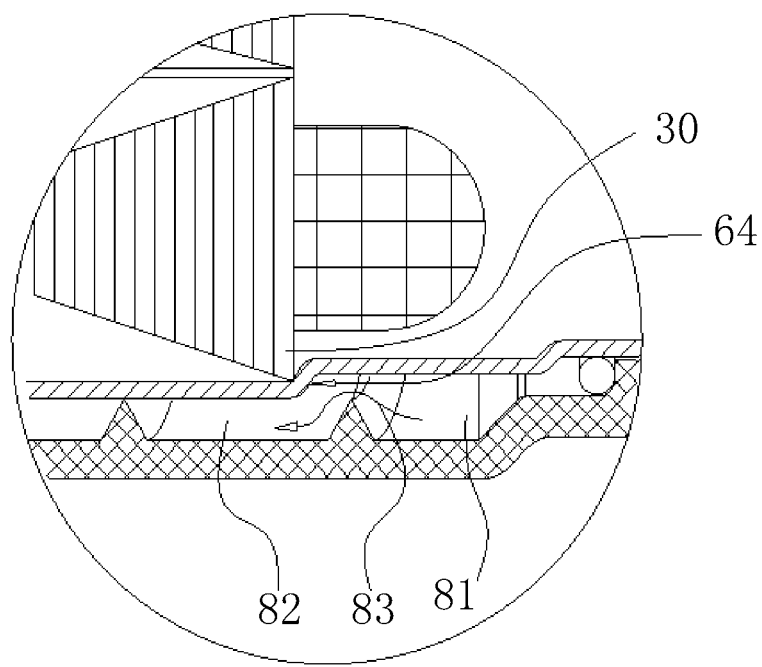
FIG. 5 is a partially enlarged view of FIG. 4.
Figure 6:
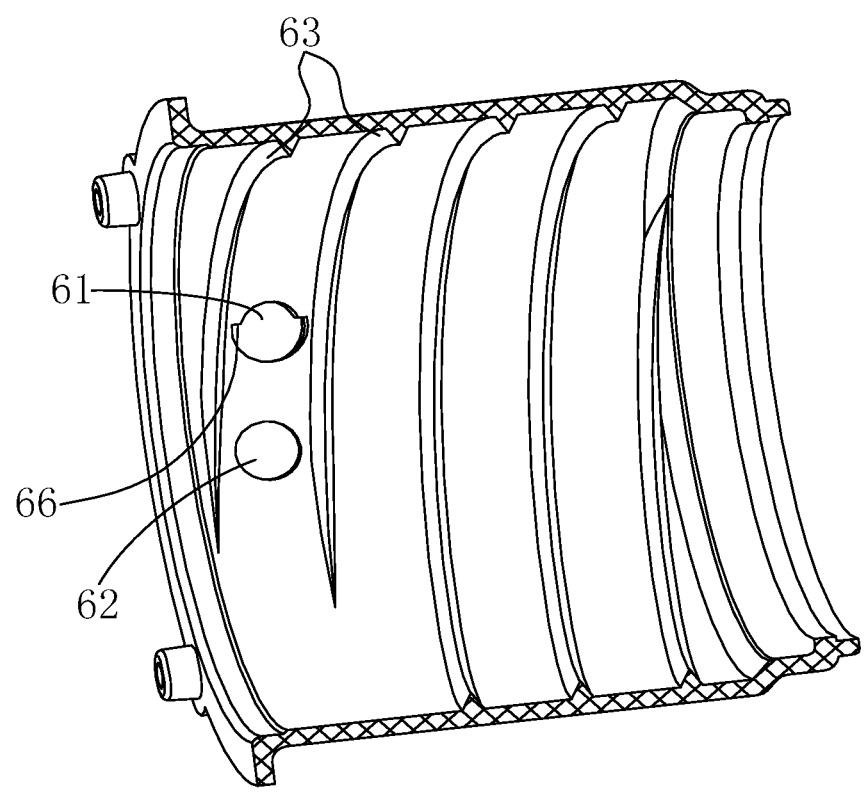
FIG. 6 depicts a cutaway view of an outer casing in accordance with one embodiment of the present invention.
Figure 7:
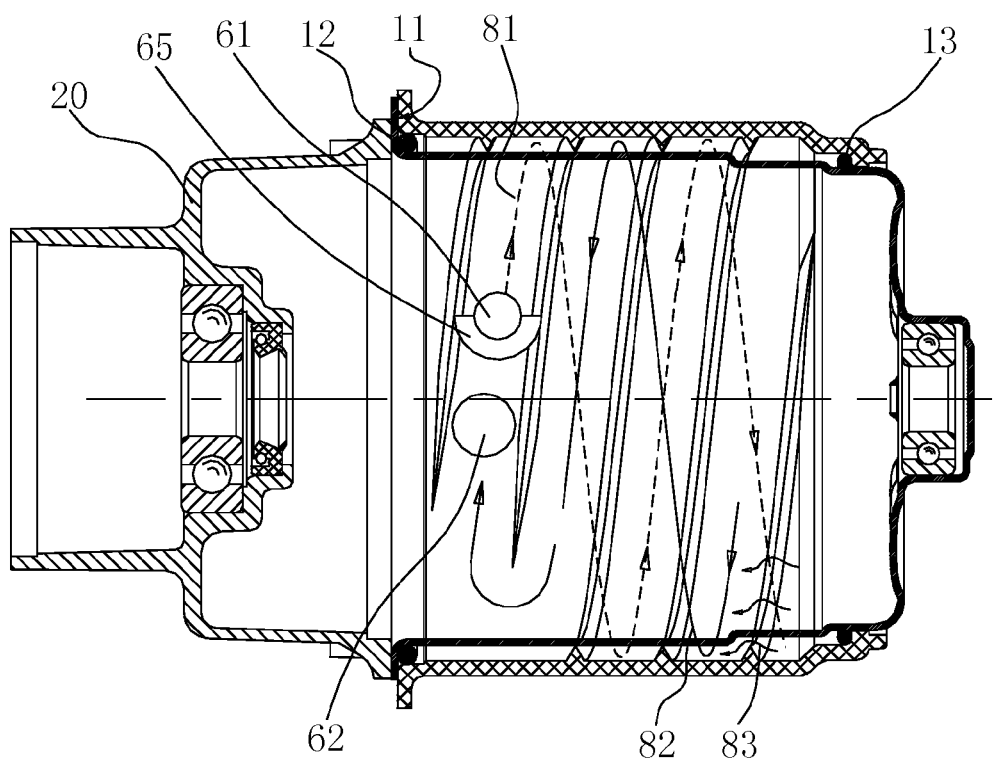
FIG. 7 diagrammatically illustrates water flow paths formed in accordance with one embodiment of the present invention.

Referring to FIGS. 2 to 4, in conjunction with, and with emphasized reference on, FIGS. 5 to 7, in one preferred embodiment, the screw thread 63 formed on the internal surface of the outer casing 60 is a two-start screw thread, and the water inlet port 61 and the water outlet port 62 are both arranged on a side of the outer casing 60 proximate the opening of the housing 10. Additionally, the two ports are individually end-connected to two water flow channels delimited by the two-start screw thread 63, and the other ends of the two water flow channels are interconnected via the flange 64 that is formed on the side wall of the housing 10. In other words, the two-start screw thread 63 delimits a water inlet channel 81 and a water outlet channel 82, which are interconnected at a connecting channel 83 delimited by the flange 64.

In the specific embodiment as shown in FIGS. 5 and 7, the water inlet channel 81 has its end axially rear to the start of the water outlet channel 82 (i.e., on the right side thereof as viewed in the figures), but the present invention is not limited in this regard. In other embodiments, the end of the water inlet channel 81 may be located axially in front of the start of the water outlet channel 82 (i.e., its location is interchanged with the start of the water outlet channel 82), and the water inlet channel 81 and the water outlet channel 82 can still be interconnected at the connecting channel 83 delimited by the flange 64.

Preferably, the water inlet port 61 is mounted with a water-blocking ring 65 for preventing water that has passed through the water inlet port 61 from flowing toward the water outlet port 62. That is, with the effect of the water-blocking ring 65, the water having passed through the inlet port 61 is directed into the inlet channel 81 rather than flowing toward the water outlet port 62. After entering the inlet channel 81, the water runs as a spiral flow until it reaches the flange 64, and after passing through the flange 64, the water further flows along the water outlet channel 82 as another spiral flow toward the water outlet port 62. Preferably, the water inlet port 61 assumes a shape that is not a regular circle and matches the shape of the water-blocking ring 65, so as to prevent the water-blocking ring 65 from rotating relative to the outer casing 60. For example, the water inlet port 61 may include two rotation-stop portions 66. As shown in FIG. 6, the rotation-stop portions 66 match in shape with corresponding portions of the water-blocking ring 65. As such, the water-blocking ring 65 will not be rotatable when its portions respectively engaging the corresponding rotation-stop portions 66 of the water inlet port 61.

Preferably, as shown in FIGS. 2 and 3, the water inlet port 61 and the water outlet port 62 are connected to a water inlet pipe 71 and a water outlet pipe 72, respectively, by transition connectors 70. In a specific embodiment, the water inlet pipe 71 and the water outlet pipe 72 are connected to a first connector 70*a* and a second connector 70*b*, respectively, with the water inlet port 61 and the water outlet port 62 being connected to a third connector 70*c* and a fourth connector 70*d*, respectively, and each connection is sealed by a third seal ring 67. The directions of the water flows can be changed by manipulating the transition connectors 70.

Preferably, the housing 10 includes an outwardly flaring lip 11 at its end in contact with the end cover 20 (i.e., the end of the opening). In a specific embodiment, the end cover 20, the housing 10 and the outer casing 60 are secured together by screw pins and corresponding thread holes (not shown) formed in each of the end cover 20, the lip 11, and the outer casing 60.

Preferably, as shown in FIGS. 3, 4, 6 and 7, the interconnected ends of the outer casing 60 and the housing 10 are respectively provided with a first seal ring 12 and a second seal ring 13, such that the water flows formed between the housing 10 and the outer casing 60 are connected to the outside only by the water inlet port 61 and the water outlet port 62, thus ensuring a desired sealing effect.

Preferably, the present invention is in particular suitable for use in a motor-pump unit of a high-pressure cleaning appliance. As shown in FIGS. 2 and 3, the motor is used in combination with a pump 90 mounted on a front end thereof The motor of the present invention is cooled by water intake of the pump itself which is introduced in the motor via the pipe 71 and discharged from the motor, via the pipe 72 and an inlet of the pump, into the pump where it is pressurized and further discharged out through an outlet 91 of the pump. This design enables the motor cooling to be performed without needing a special water supply and piping components for establishing the associated water supply paths, thus leading to material savings. In addition, it adopts the water cooling method which generates less noise than a method using fans.

In summary, the water-cooled motor of the present invention is able to isolate two water flow channels 81, 82 between the outer casing 60 and the housing 10 by forming a two-start screw thread 63 on the internal surface of the outer casing 60, and is further able to interconnect the two water flow channels 81, 82 by simply arranging a flange 64 on the side wall of the housing 10 without adopting any additional connecting means, which allows the construction of a motor with a greatly simplified structure. Additionally, arranging the inlet and outlet ports 61, 62 on the same side of the outer casing 60 makes the inventive motor more compact in structure. Further, by adopting a simple water-blocking ring 65, the water-cooled motor of the present invention can not only effectively prevent water having passed through the inlet port 61 from flowing toward the outlet port 62 but also simplify needed molds for the outer casing 60 to greatly reduce the manufacturing cost thereof Obviously, those skilled in the art may make various modifications and alterations without departing from the spirit and scope of the invention. It is therefore intended that the invention be construed as including all such modifications and alterations insofar as they fall within the scope of the appended claims or equivalents thereof

What is claimed is:

1. A water-cooled motor, comprising:
   a housing for accommodating at least a stator and a rotor, the housing comprising a bottom, a side wall, and an opening opposite the bottom, the side wall having a flange formed thereon;
   an outer casing disposed around the side wall of the housing, the outer casing having a two-start screw thread formed on an internal surface thereof to provide a water inlet channel and a water outlet channel between the housing and the outer casing;
   a water inlet port arranged on the outer casing and being connected to a first end of the water inlet channel; and
   a water outlet port arranged on the outer casing, the water outlet port being adjacent to the water inlet port and being connected to a second end of the water outlet channel,
   wherein a second end of the water inlet channel and a first end of the water outlet channel are interconnected at the flange.

2. The water-cooled motor of claim 1, further comprising a water blocking ring mounted on the water inlet port and proximate the water outlet port, the water blocking ring being configured to prevent water that has passed through the water inlet port from flowing directly toward the water outlet port.

3. The water-cooled motor of claim 2, wherein the water inlet port is configured to be able to prevent, after the water blocking ring has been mounted thereon, the water blocking ring from rotating relative to the outer casing.

4. The water-cooled motor of claim 1, wherein the water inlet port and the water outlet port are both disposed on a side of the outer casing proximate the opening of the housing.

5. The water-cooled motor of claim 1, further comprising:
- a first transition connector for interconnecting the water inlet port to an external water inlet pipe; and
- a second transition connector for interconnecting the water outlet port to an external water outlet pipe.

6. The water-cooled motor of claim 1, wherein the housing comprises an outwardly flaring lip around the opening.

7. The water-cooled motor of claim 1, further comprising:
- a first seal ring disposed between the housing and a first end of the outer casing; and
- a second seal ring disposed between the housing and a second end of the outer casing.

8. The water-cooled motor of claim 1, wherein the housing is made of a metallic material and the outer casing is made of a plastic material.

9. The water-cooled motor of claim 1, wherein the housing is a one-piece structure.

* * * * *